United States Patent
Evans et al.

(10) Patent No.: US 6,734,979 B2
(45) Date of Patent: May 11, 2004

(54) RAPID IN SITU MASTERING OF AN ASPHERIC FIZEAU WITH RESIDUAL ERROR COMPENSATION

(75) Inventors: Christopher James Evans, Higganum, CT (US); Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/288,218

(22) Filed: Nov. 5, 2002

(65) Prior Publication Data

US 2003/0090678 A1 May 15, 2003

Related U.S. Application Data (60) Provisional application No. 60/336,360, filed on Nov. 15, 2001.

(51) Int. Cl.$^7$ ................................................. G01B 9/02
(52) U.S. Cl. ........................................ 356/512; 356/515
(58) Field of Search ................................ 356/512, 513, 356/515, 489, 495

(56) References Cited

U.S. PATENT DOCUMENTS

| | | |
|---|---|---|
| 4,347,441 A | 8/1982 | Dil et al. |
| 4,697,927 A | 10/1987 | Ono |
| 5,004,346 A | 4/1991 | KuMichael |
| 5,285,142 A | 2/1994 | Galburt et al. |
| 5,416,586 A | 5/1995 | Tronolone et al. |
| 5,625,454 A | 4/1997 | Huang et al. |
| 5,844,670 A | 12/1998 | Morita et al. |
| 5,982,490 A | 11/1999 | Ichikawa et al. |
| 6,312,373 B1 | 11/2001 | Ichihara |
| 6,359,692 B1 | 3/2002 | de Groot |
| 6,456,382 B2 | 9/2002 | Ichihara et al. |
| 2001/0028462 A1 | 10/2001 | Ichihara et al. |

OTHER PUBLICATIONS

Lin, Ding–tin, and Wang, Der–Shen. "Profile Measurement Of An Asperic Cylindrical Surface From Retroreflection." Applied Optics, vol. 30, No. 22 (Aug. 1, 1991): pp. 3200–3204.

Dörband, B. et al. "High Precision Interferometric Measurements of Lens Elements." Fringe 97: Proceedings of the 3rd International Workshop on Automatic Processing of Fringe Patterns Held in Bremen, Germany, Sep. 15–17, 1997. pp. 473–480.

V. Greco, et al., "Interferometeric testing of weak aspheric surfaces versus design specifications", Optik, 87, No. 4 (1991), pp 159–162.

*Primary Examiner*—Samuel A. Turner
(74) *Attorney, Agent, or Firm*—Francis J. Caufield (57) ABSTRACT

A method with a traceable calibration for reducing the uncertainty in the precision measurement of aspheric surfaces and wavefronts. A transmission sphere is mounted in an interferometer and its emergent wavefront is calibrated by comparing it to an optical sphere that is moved and sampled in a predetermined manner to make it act like a substantially "perfect" sphere mounted on a slideway. Afterwards, the calibrated wavefront from the transmission sphere is used to measure a spherical artifact mounted on the slideway to calibrate its surface. A transmission asphere is then mounted in the interferometer, and its emergent wavefront is calibrated by comparing it to the calibrated spherical artifact mounted on the slideway. The calibrated aspheric wavefront from the interferometer is then used to measure an aspherical artifact mounted on the slideway to determine is surface shape. The calibration of the wavefront emerging from the transmission asphere is periodically updated to provide historical data that is used as the basis for quality improvement and assurance.

13 Claims, 8 Drawing Sheets

RAPID IN SITU MASTERING OF AN ASPHERIC FIZEAU WITH RESIDUAL ERROR COMPENSATION

CROSS REFERENCE TO RELATED APPLICATION

This application claims benefit from U.S. Provisional Patent Application No. 60/336,360 filed on Nov. 15, 2001 in the name of Christopher James Evans, et al. for RAPID IN SITU MASTERING OF AN ASPHERIC FIZEAU WITH RESIDUAL ERROR COMPENSATION, the entire contents of which are incorporated herein by reference.

BACKGROUND OF THE INVENTION

This invention generally relates to interferometry and more particularly to apparatus and methods by which aspheric surfaces and wavefronts may be rapidly and precisely measured.

Aspheric surfaces offer significant advantages to the designers of high performance optical systems, but their widespread adoption has been hampered by difficulties in manufacture and measurement. Next generation lithography systems, however, are being designed with aspheric surfaces with apertures approaching 0.5 meters, high numerical apertures, and tolerances on the surface shape of less than 1 nm. A large number of approaches to the measurement of aspheric surfaces and wavefronts have been described over the years, each with advantages and disadvantages.

Küchel, in U.S. Provisional Patent Application No. 60/299,614 filed on Jun. 20, 2001 (now U.S. patent application Ser. No. 10/160,672 filed on Jun. 3, 2002 and published on Jan. 2, 2003 as US-2003-0002049 A1), introduced new approaches to measuring aspheric optics in a scanning interferometer. This was extended in U.S. Provisional Patent Application No. 60/303,856 filed on Jul. 9, 2001 (now U.S. patent application Ser. No. 10/180,286 filed on Jun. 26, 2002 and published on Mar. 6, 2003 as US-2003-0043385 A1) to allow explicitly for the collection of the data (to be reduced in the manner taught in the 60/299,614 application, id.) using a Fizeau interferometer. Such scanning approaches described by Küchel and others (e.g. Tronolone, U.S. Pat. No. 5,416,586) tend to be slow, leading Zanoni in U.S. Provisional Patent Application No. 60/299,512 filed on Jun. 20, 2001 (now U.S. patent application Ser. No. 10/152,075 filed on May 21, 2002 and published on Jan. 2, 2003 as US-20030002048 A1) to propose the use of an interferometer with an aspheric reference surface which would be calibrated elsewhere, for example, following the method of Küchel. Measuring the reference surface on a separate instrument introduces issues of stability in the transfer from one instrument to another, as well as practical issues relating to the frequency of recalibration. These issues were addressed by Evans and Küchel in U.S. Provisional Patent Application No. 60/317,028 filed on Sep. 4, 2001 (now U.S. patent application Ser. No. 10/233,772 filed on Sep. 3, 2002 and published on March 13, 2003 as US-2003-0048457 A1), who proposed an approach in which the aspheric reference surface of a Fizeau interferometer is mastered by scanning with a reference sphere. The aspheric part to be measured is then inserted into the instrument (without dismounting the reference asphere). The approach of the 60/317,028 (10/233,772, id.) Application presumes that a reference sphere of sufficient, known quality is available and can be installed in the instrument without distortion.

Accordingly, It is the object of this invention to provide a measurement process which provides for traceable calibration of aspheric optics.

It is a further object of the invention to provide a procedure for continuous improvement of the uncertainty of the measurement made using interferometric instruments.

It is another object of this invention to provide a process with inherent quality assurance, allowing monitoring of the stability of the measurement process.

Other objects of the invention will, in part, appear obvious and will, in part, appear hereinafter when the following detailed description is read in connection with the accompanying drawings.

SUMMARY OF THE INVENTION

This invention provides apparatus and methodology for traceable measurement of aspheric optical surfaces or wavefronts with internal self-consistency checks through two parallel routes to part measurement. Apparatus comprises a Fizeau interferometer which can be configured with optics that produce either spherical or deliberately aspheric wavefronts and with means of scanning test surfaces along the optical axis. Algorithms and procedures requiring multiple measurements are provided to compensate measurement data for bias arising from error motions of the slideway. Provision is made for storing and frequently renewing instrument calibration data. Trend analysis of that frequently retaken calibration data is used to indicate and, hence, manage measurement system performance.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION OF THE INVENTION

Traceability is defined (ISO: International Vocabulary of Basic and General Terms in Metrology) as the "property of the result of a measurement . . . whereby it can be related to stated references, usually national or international standards, through an unbroken chain of comparisons all having stated uncertainties". In the case of measurements of the departure of optical surfaces or wavefronts from their desired shape, the relevant international standard is length, which is defined in terms of the distance an electromagnetic wave propagates in a vacuum in a fixed period of time. That unit is realized in an interferometer through measuring (with appropriate uncertainty) the wavelength. Given the unit of length, a variety of techniques have been described for so-called "absolute testing" of spherical surfaces using an interferometer that generates a spherical wavefront (see for example Evans C. J, Hocken R. J., and Estler W. T., "Self-calibration: reversal, redundancy, error separation and "absolute testing", CIRP Annals, Vol 45/2(1996), pp617–634). Recent improvements in the art are described in U.S. Provisional Patent Application No. 60/333,245 filed on Nov. 14, 2001 (now U.S. patent application Ser. No. 10/277,553 filed on Oct. 22, 2002). Thus, the departure of an artifact that is nominally a segment of a sphere from a mathematical best fit sphere can be measured with a stated uncertainty. Simultaneously, the departure of the interferometer wavefront is also measured with a stated uncertainty. Now the teachings of Küchel, et al. and Zanoni can be followed along two different paths (that should agree within their (different) stated uncertainties) to make traceable measurements of an aspheric surface or wavefront of interest.

1. The aspheric part can be measured using the previously calibrated spherical interferometer shown in previously mentioned U.S. Provisional Patent Application Nos. 60/299,614 (now U.S. patent application Ser. No. 10/160,672 published on Jan. 2, 2003 as US-2003-0002049 A1) and 60/303,856 (now U.S. patent application Ser. No. 10/180,286 published on Mar. 6. 2003 as US-2003-0043385 A1), the disclosures of both of which are incorporated herein by reference in their entirety; or
2. The spherical artifact can be scanned in front of an aspheric Fizeau of the type disclosed in previously mentioned U.S. Provisional Patent Application Nos. 60/299,512 (now U.S. patent application Ser. No. 10/152,075 published on Jan. 2, 2003 as US-2003-0002048 A1); 60/303,856 (now U.S. patent application Ser. No. 10/180,286 published on Mar. 6, 2003 as US-2003-0043385 A1); and 60/317,028 (now U.S. patent application Ser. No. 10/233,772 published on Mar. 13, 2003 as US-2003-0048457 A1), the entire disclosures of which are incorporated herein by reference, to measure its wavefront with a stated uncertainty. The aspheric Fizeau can now be used to measure the aspheric surface, again with a stated uncertainty.

These two procedures can be implemented in a single special purpose interferometer using a replaceable optical system (referred to as, respectively, a "transmission sphere" or "transmission asphere") using the following 4 step approach, or any one of a number of variants on it, which will be immediately apparent to those skilled in the art.

Figure 1:
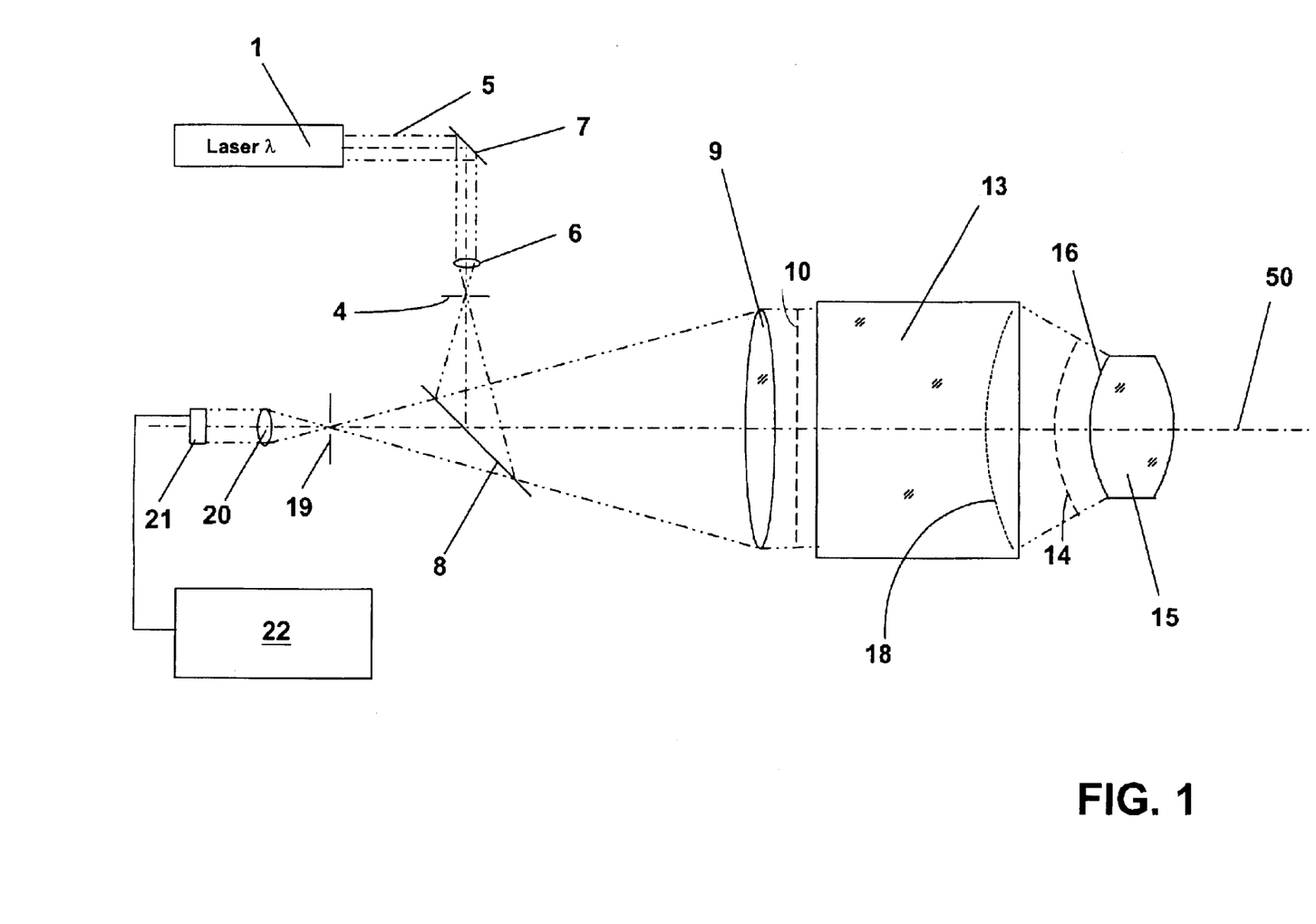
FIG. 1 is a diagrammatic elevational view of an interferometric system that can be used to perform high precision measurements of an optical element carrying a spherical or aspherical surface.

FIG. 1 shows an interferometric system, which can be used to perform a high precision measurement of, for example, an optical element 15 carrying a spherical or aspherical surface 16. In FIG. 1, a laser 1 is shown, which emits a beam 5 at wavelength $\lambda$. Beam 5 is redirected downwardly by a reflecting element 7 and is then focused to a small spot with the help of lens 6 and cleaned by a small pinhole 4. The pinhole 4 is located in the focal plane of a well-corrected collimator lens 9 which is configured to produce a plane wavefront 10 at the operating wavelength.

The plane wavefront 10 enters an optical system ("transmission sphere") 13, which appears only very schematically as a "box", not showing the details of the optical lay-out. This lay-out depends on the exact functionality of the lens for a given task and can differ considerably from case to case. For present purposes, the lens-system 13 produces a wavefront 14, which is close to a spherical wave (nominally spherical, with deviations small enough to be measured with high accuracy).

The light reflected by a surface 18 serves as a reference wavefront, and the light transmitted by the system 13, reflected by the surface 16 and again transmitted by the system 13 acts as the measurement wavefront. Both wavefronts travel back through the collimator lens 9 and a beamsplitter 8 after which they pass through an aperture 19. A lens 20 images the surface 18 onto a CCD detector 21, where an interferogram can now be seen. With proper phase-measurement techniques, which are well-known to those knowledgeable in the art, and which are therefore not described here, the optical path difference between the interfering wavefronts are measured and transferred to a computer 22. It will be understood that computer 22 also may be programmed for performing other computational, logical, operational, and housekeeping tasks.

The preferred embodiment of the invention is a Fizeau interferometer and, hence, the final surface of lens system 13 is the reference surface 18, which is concentric to the focal point of the spherical wavefront 14. It will be immediately apparent to those versed in the art that the inventions described herein can equally be implemented with other interferometer configurations such as, for example, Twyman-Green.

Figure 2:
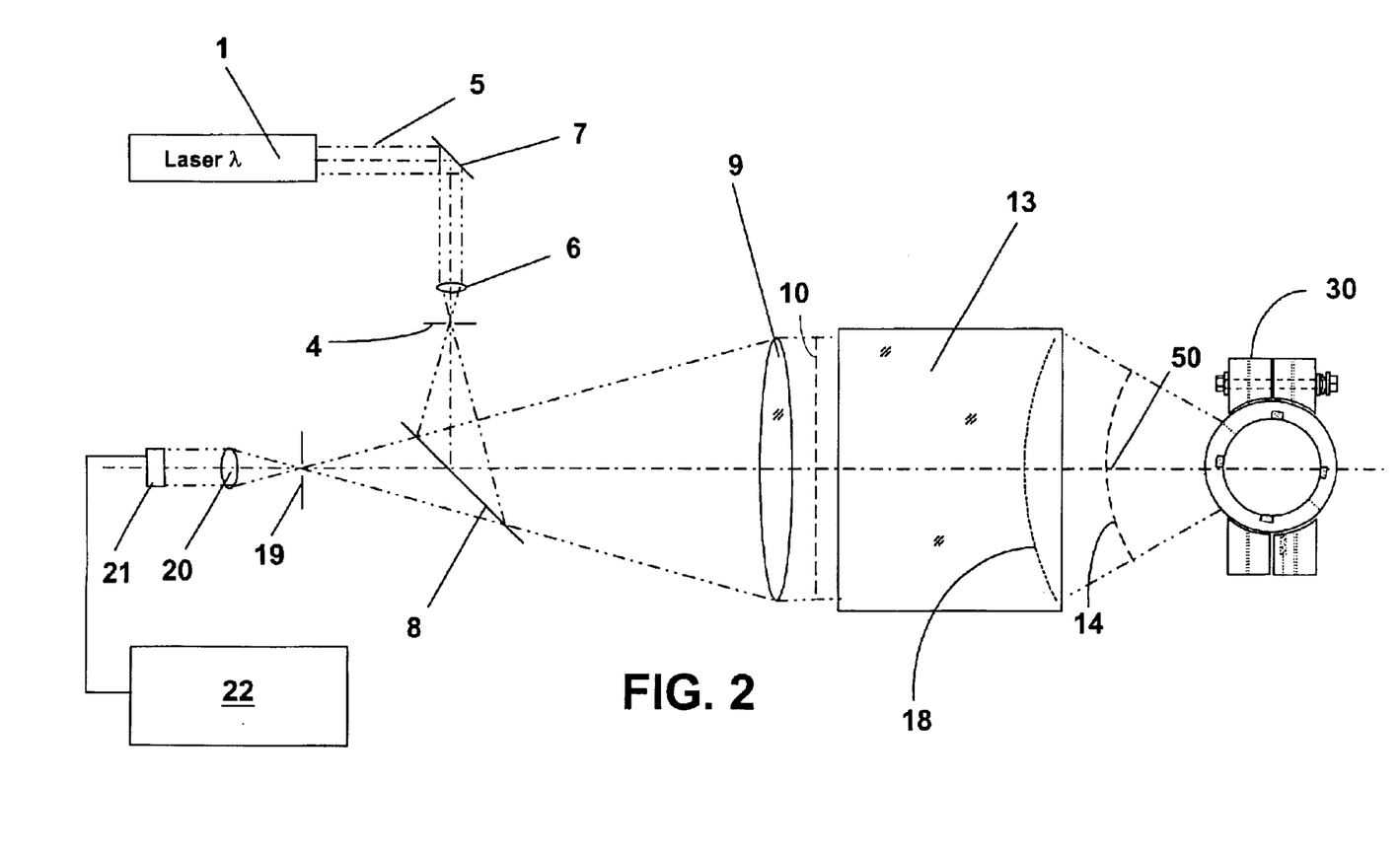
FIG. 2 is a diagrammatic elevational view of the interferometric system of FIG. 1 shown configured with an actuable optical sphere used in determining the actual deviations of the reference, nominally spherical, wavefront or surface delivered by the interferometer from its theoretical design.

The first step of the 4 step approach referred to above is to determine the actual deviations of the reference surface 18 (for a Fizeau) or wavefront 14 (Twyman-Green) from it's theoretical design value. One approach is to use the actuable ball 30, preferably hollow and constructed of a ceramic material such as Zerodur®, described in U.S. Provisional Patent Application No. 60/333,245 filed on Nov. 14, 2001 (FIG. 2), now U.S. patent application Ser. No. 10/277,553 filed on Oct. 22, 2002 and published on May 15, 2003 as US-2003-0090798 A1, or one of the many self-calibration methods reviewed, inter alia, in Evans C. J, Hocken R. J., and Estler W. T. "Self-calibration: reversal, redundancy, error separation and "absolute testing"."CIRP Annals, Vol 45/2(1996) pp617–634.

Figure 3:
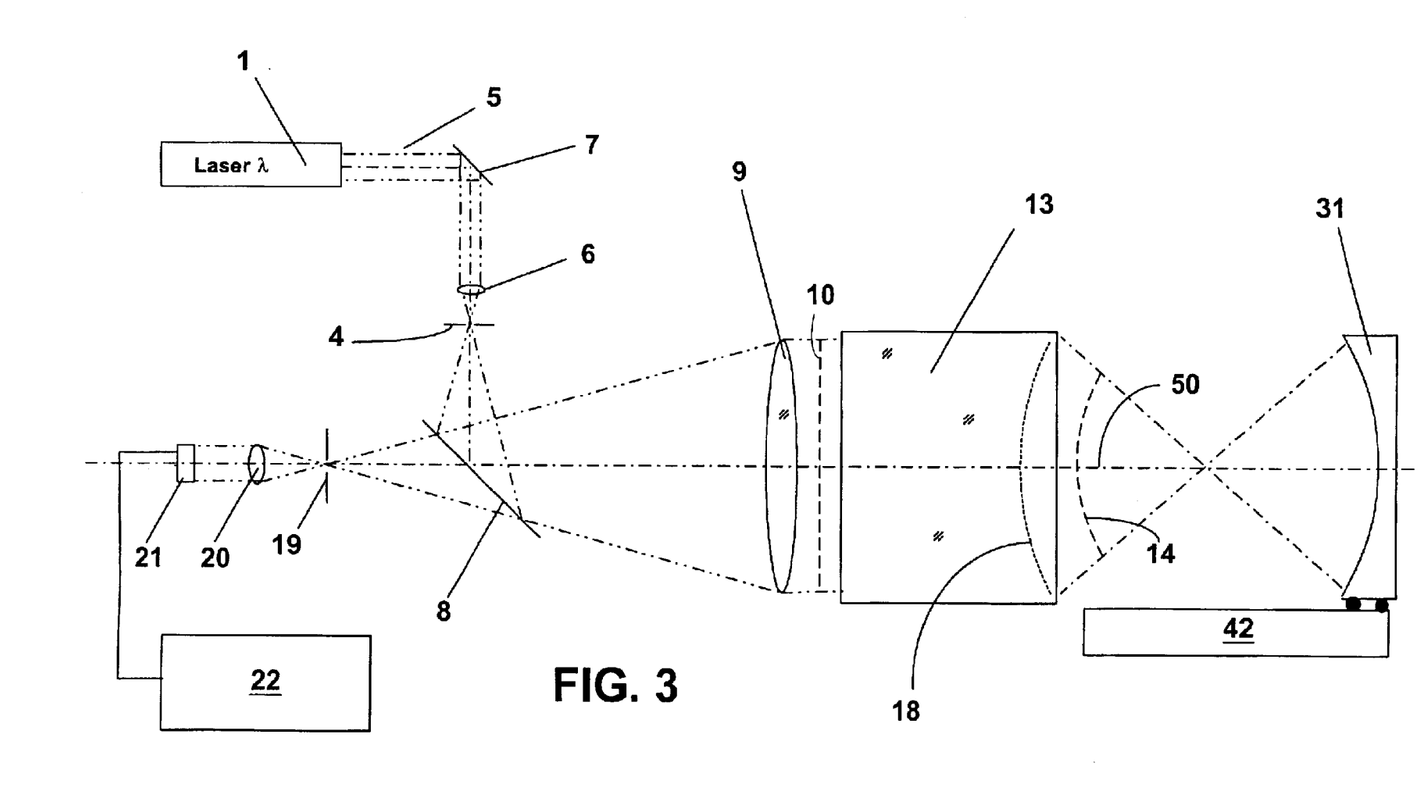
FIG. 3 is a diagrammatic elevational view of the interferometric system of FIG. 2 now calibrated to measure an appropriate spherical artifact.

The second step in the 4 step approach referred to above is to use the now calibrated interferometer complete with its transmission sphere 13 to measure an appropriate spherical artifact 31 (FIG. 3).

The third step is to replace the transmission sphere 13 with a second optical system (referred to here as the "transmission asphere") 41 which generates an aspherical wavefront. The preferred embodiment of the invention is as a Fizeau interferometer and hence the final surface of lens system 41 is an aspheric reference surface 40 designed following the teachings of Zanoni, 60/299,512 (now U.S. patent application Ser. No. 10/152,075 published on Jan. 2, 2003 as US-2003-0002048 A1). The spherical artifact is now scanned using slideway 42 along the optical axis (horizontally in FIG. 4), and data acquired and reduced following the teachings of Küchel, 60/299,614 (now U.S. patent application Ser. No. 10/160,672 published on Jan. 2, 2003 as US-2003-0002049 A1) and/or 60/303,856 (now U.S. patent application Ser. No. 10/180,286 published on Mar. 6, 2003 as US-2003-0043385 A1). Since the departures of the spherical artifact were established in the previous step, this step calibrates the aspheric wavefront produced by the interferometer and its transmission asphere 41.

Figure 5:
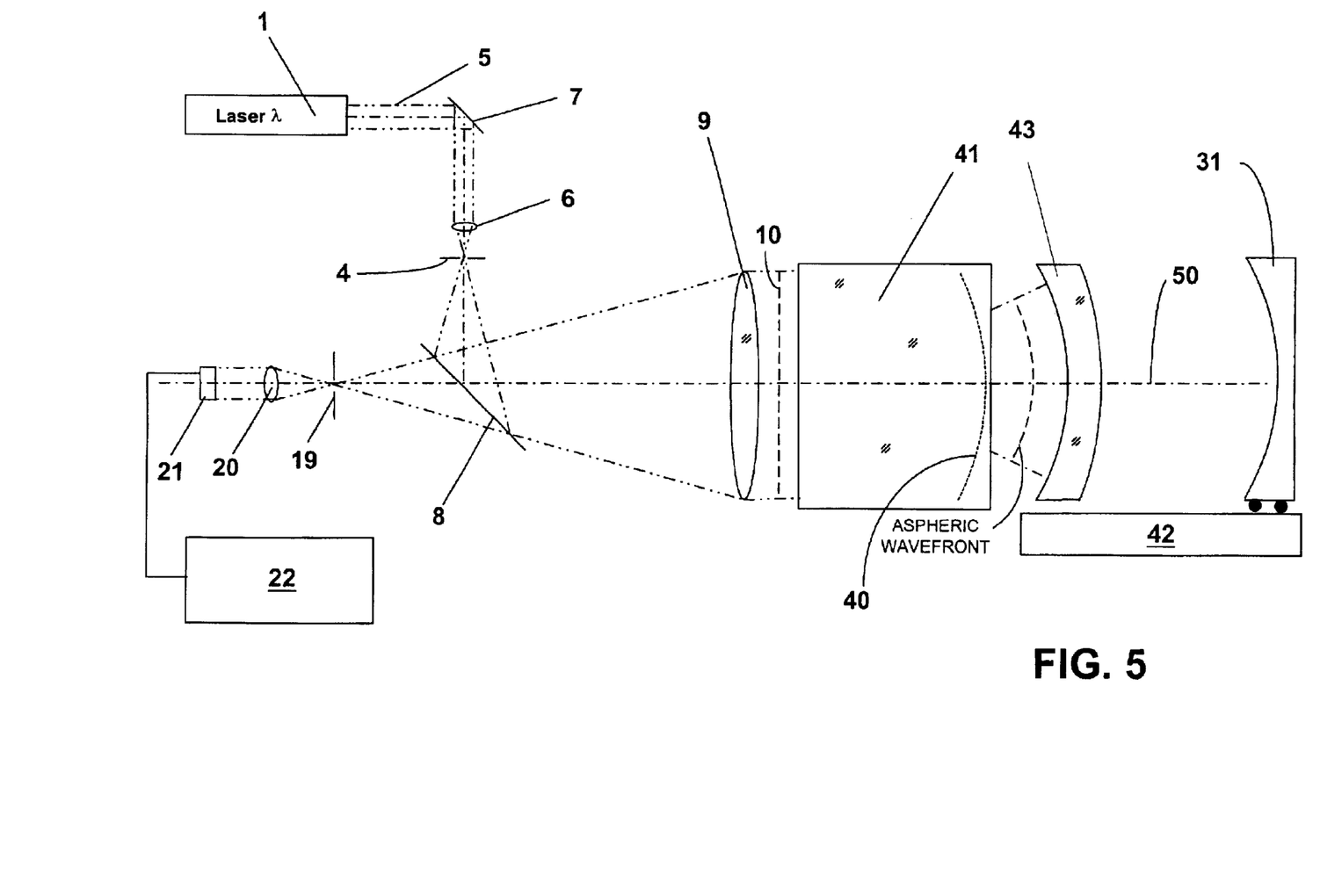
FIG. 5 is a diagrammatic elevational view of the interferometric system of FIG. 4 now calibrated to measure an appropriate aspheric artifact.

The final step uses the interferometric system as calibrated above to measure (FIG. 5) an aspheric surface 43, or wavefront of interest, following the teachings of Zanoni, 60/299,512 (now U.S. patent application Ser. No. 10/152,075 published on Jan. 2, 2003 as US-2003-0002048 A1). Note that the spherical artifact 31 has not been removed from the system.

Measurement, with a stated uncertainty, of the wavelength $\lambda$ produced by laser 1 introduces the unit of length into an unbroken chain of comparisons (Steps 1–4 above) for each of which it is possible to state the uncertainty of the comparison. Hence, the process provides a traceable measurement of the aspheric surface or wavefront.

Figure 4:
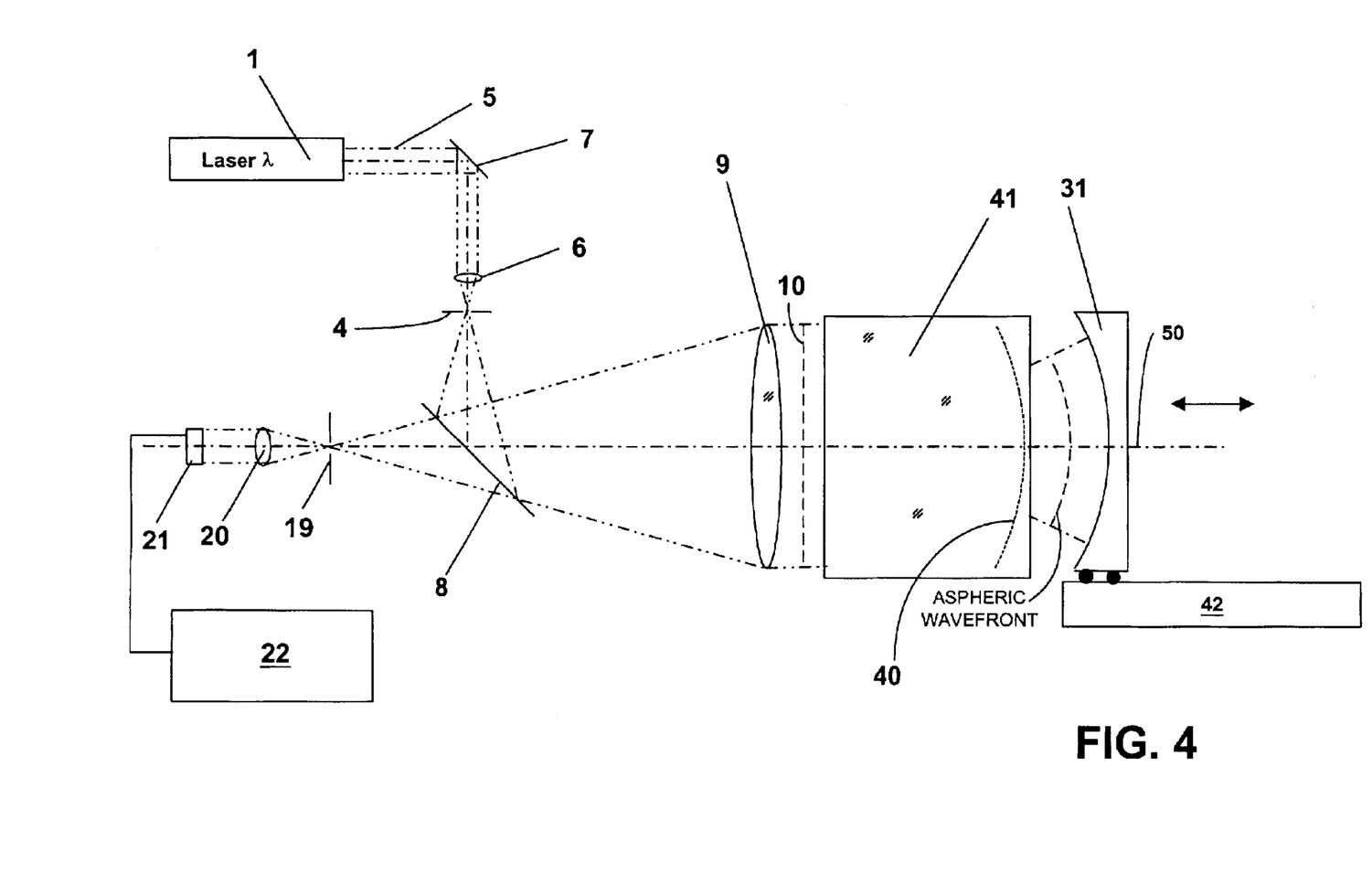
FIG. 4 is a diagrammatic elevational view of an interferometric system that has been provided with a transmission asphere and the measured spherical artifact of FIG. 3 to assist in calibrating the aspherical wavefront delivered by the transmission asphere.

It will be apparent to those skilled in the art that one source of uncertainty in the resulting measurement arises from pitch, yaw, and vertical and horizontal straightness errors in slideway 42 during the scanning motion of Step 3 illustrated by FIG. 4. Three different approaches reduce the uncertainty in the final result from the error motions of the slide.

Figure 7:
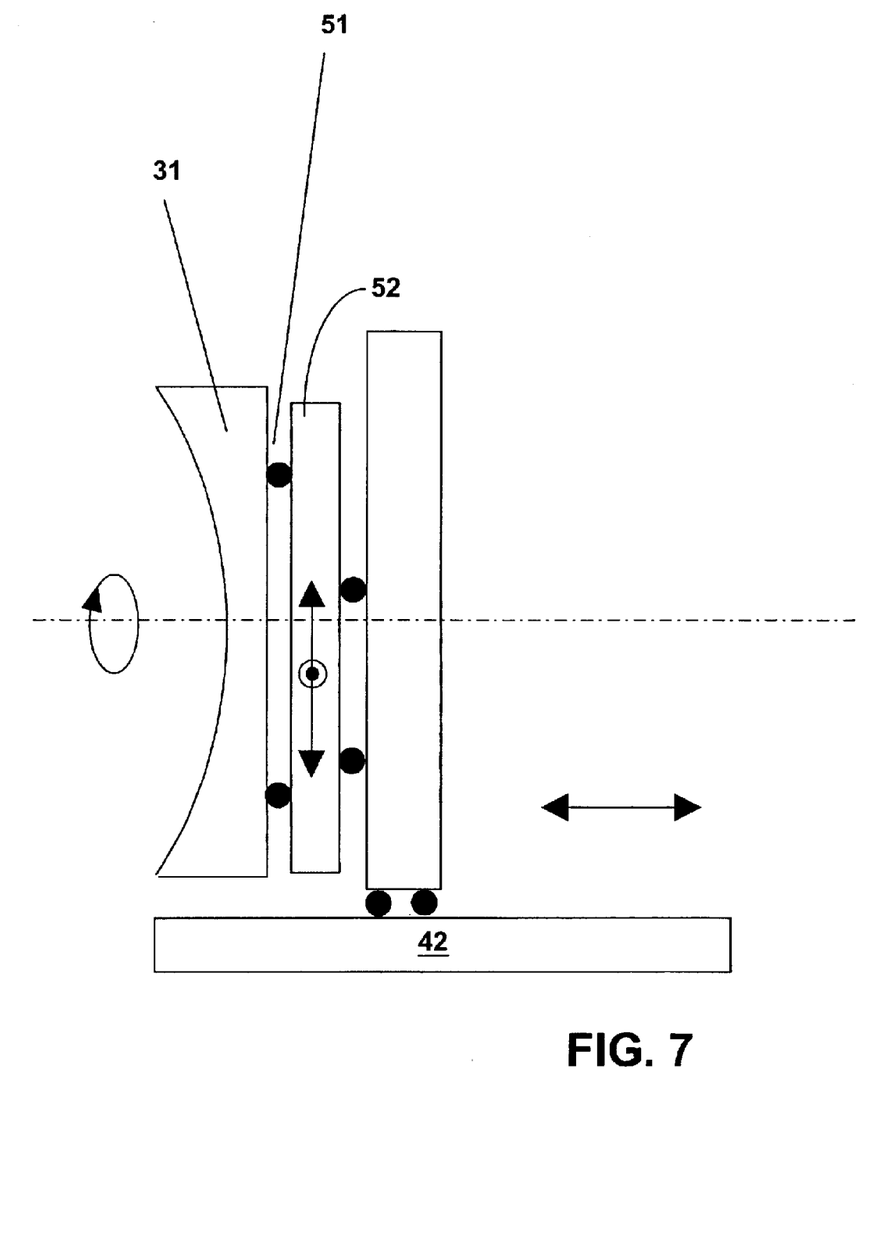
FIG. 7 is a diagrammatic elevational view of a mounting arrangement by which a spherical artifact may be rotated to practice certain aspects of the invention.

In the first approach, spherical artifact 31 can be mounted on an actuated sub-stage the position of which is measured with respect to stationary metrology reference surfaces. A servo control system then actuates a sub-stage 52 (FIG. 7) in such a manner that spherical artifact 31 moves solely along the optical axis. The sub-stage may use flexures, magnetic levitation, or air, liquid or solid lubrication to allow motions actuated by voice coils, piezoelectric, magnetostrictive or other devices and sensed by transducers such as laser interferometers, capacitance gages, or optical scales. A variety of implementations will be apparent to those conversant with the arts practiced, for example, in lithographic systems (see, for example, Galburt and O'Connor U.S. Pat. No. 5,285,142, 1994). Alternatively, if the error motions are measured, their effect on the measurement result may be computed and the data appropriately compensated.

To implement the second and third approaches, carriage 42 must be provided with means 51 to rotate the spherical artifact 31 (See FIG. 7) and/or test piece including surface of interest of element 43. Also, to understand the second and third approaches, it is important to recognize that the contribution to the uncertainty can be considered in two components: those that arise from systematic (or repeatable) error motions and those that arise from non-repeatable motions of the slideway system.

In the second method of compensating for slideway errors, data is taken four times, with the spherical artifact 31 rotated 90 degrees between each data cycle—referred to here as M0, M90, M180, and M270, where M0 is data taken with a part in a "first" position, M90 after the part is rotated 90 degrees, etc. Now half the difference between the data file M0 and the data file M180 rotated by 180 degrees represents the contribution to the measurement data resulting from one direction of straightness error motion and the tilt in the same direction (from the principle of superposition, the origin is arbitrary). Similarly, half the difference between M90 and M270 rotated by 180 degrees represents the contribution to the measurement data resulting from errors in the orthogonal direction. Hence, the contribution to the measurement results arising from systematic error motions of the slideway may be computed and subtracted from each measurement. These errors can now be subtracted from each of the measurements which, after appropriate manipulation to ensure that the data sets are properly orientated, can be averaged to reduce by the square root of the number of measurements (i.e., $\sqrt{4}=2$) the influence of slide error motions arising from random sources. Further reduction in these uncertainties will be obtained from increased numbers of measurements.

Figure 6:
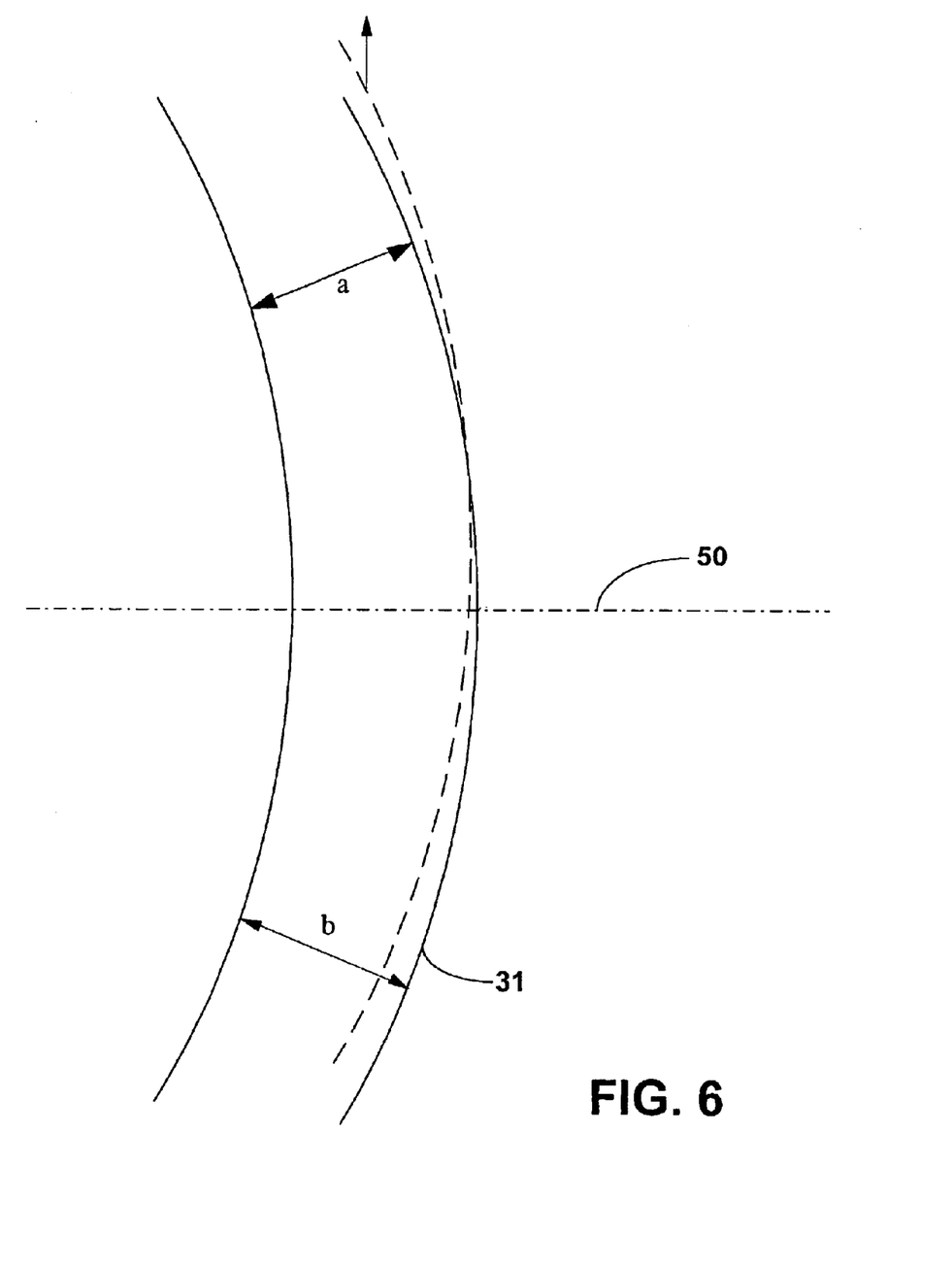
FIG. 6 is a diagram showing the vertical movement of a spherical surface with respect to its nominal, on-axis, position and is included to aid in explaining one aspect of the invention.

The third approach is based on the idea that, for systems that are rotationally invariant about the optical axis 50, reasonable amplitude error motions produce uncertainties that have reflection symmetry with opposite sign. This is shown schematically in FIG. 6 where the surface of spherical surface 31 in shown to move vertically (dotted lines) with respect to its nominal, on axis, position. In this case the apparent distance to 31 seen by the spherical wavefront with respect to two symmetrically positioned points a, b increase and decrease by very nearly the same amount; practically, they can be taken to be the same over a range determined by the required uncertainty in the measurement to be made of the optical surface or wavefront of interest. The effect of this motion can be treated in the data by two methods.

Now, step 3 can be used only to calculate the average radial profile of the part, following well-known methods. Azimuthally varying errors can be calculated by rotating part 43 using rotatable means 51 during Step 4 and averaging the data (Kestner and Evans (Applied Optics) 1996). This averaging process allows the calibration of the part and deduction of the rotationally varying errors in the instrument.

Figure 8:
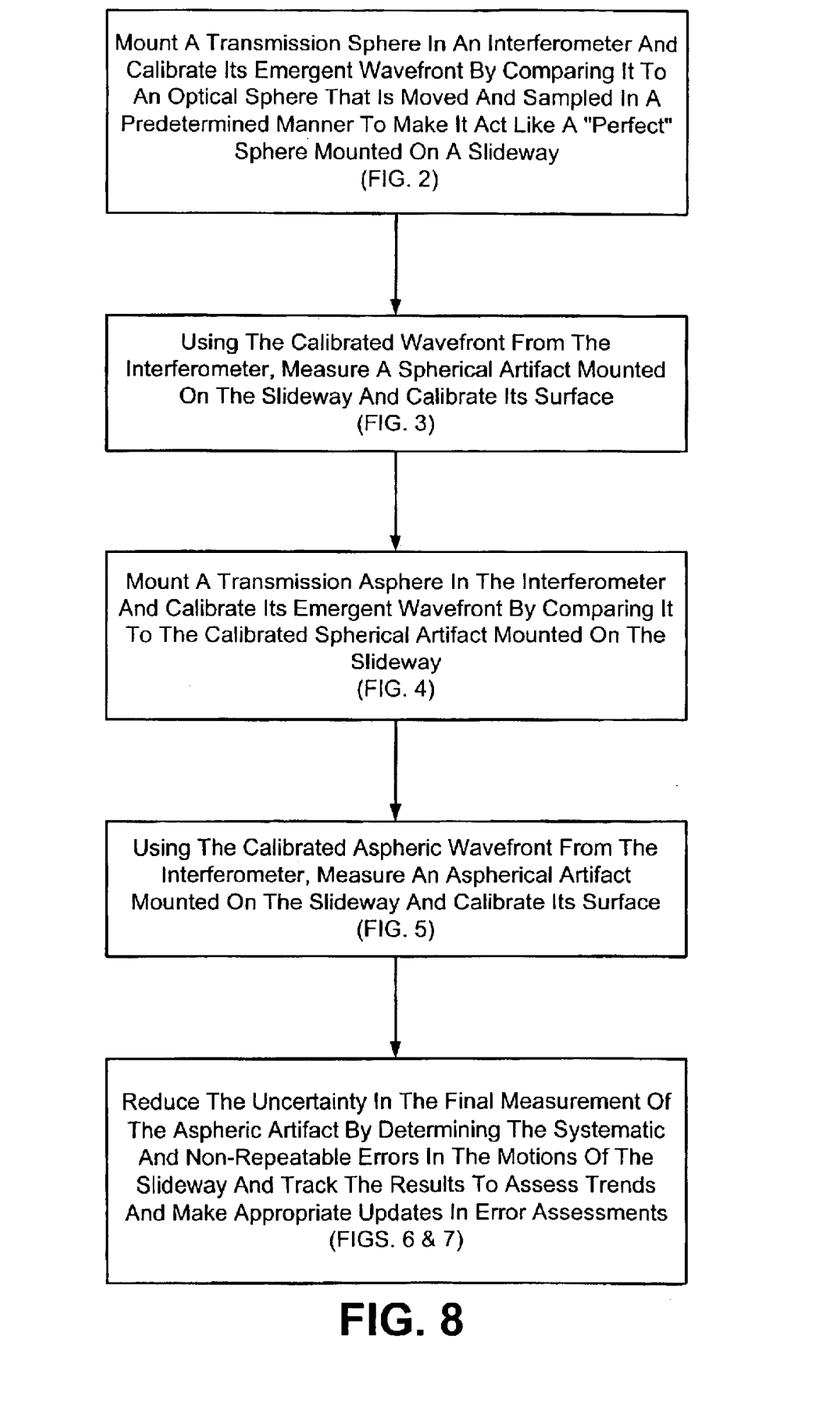
FIG. 8 is a high level flow chart illustrating the methodology of the invention.

Note that when the part is mounted on carriage 42 (Step 4), the spherical artifact 31 is left mounted in situ. Thus, the spherical artifact 31, unaltered by varying mounting stresses, etc, may be used periodically to repeat the scan of Step 3. Equally, after the part 43 has been measured using multiple rotational positions, the resulting estimate of the error of the instrument may be stored and compared with future estimates made using other parts. Hence, this is the basis for a simple measurement quality improvement and quality assurance system. Every scan of the spherical artifact generates new data on the aspheric wavefront; averaging with previous results continues to improve the estimate of the wavefront by reducing the effect of uncertainties arising from random sources. Similarly, mathematical characterizations of the estimate (e.g., power spectrum, Zernike fit, etc) can be tracked and trends in that data over time used to decided when the first two steps of the process need to be repeated due to dimensional changes in the system, drifts, etc. Additionally, measurement data may be compensated using the mean of the apparent change of the instrument as identified by a calibration scan taken immediately before and immediately after the part measurement. The flow chart of FIG. 8 summarizes the general approach described above.

It should be apparent that data taken using the multiple modes of operation of the instrument and processes using the multiple methods of data reduction identified herein should be self-consistent when the instrument is performing the required operations properly. Control computers and associated data processing provide the internal consistency checks and can display comparisons or offer GO/NO GO recommendations based on preprogrammed limits on allowable variations.

Based on the foregoing disclosure and teachings, other variants within the scope of will occur to those skilled in the art and are intended to fall within the coverage of its claims.

What is claimed is:

1. A method for reducing the uncertainty in the precision measurement of aspheric surfaces and wavefronts, said method comprising the steps of:
   mounting a transmission sphere in an interferometer and calibrating its emergent wavefront by comparing it to an optical sphere that is moved and sampled in a predetermined manner to make it act like a substantially perfect sphere mounted on a slideway;
   using the calibrated wavefront from the interferometer, measure a spherical artifact mounted on the slideway and calibrate its surface;
   mounting a transmission asphere in the interferometer and calibrating its emergent wavefront by comparing it to the calibrated spherical artifact mounted on the slideway; and
   using the calibrated aspheric wavefront from the interferometer, measure an aspherical artifact mounted on the slideway and calibrate its surface.

2. The method of claim 1 further including the step of reducing the uncertainty in the final measurement of the aspheric artifact by determining the systematic and non-repeatable motions in the slideway.

3. The method of claim 2 wherein said systematic errors comprise errors from errors in pitch, yaw, and horizontal and vertical errors in the straightness of the slideway.

4. The method of claim 2 further including the step of compensating for said systematic errors by subtracting them from actual measurements.

5. The method of claim 1 further including the step periodically calibrating the aspheric wavefront emerging from the transmission asphere against the calibrated spherical artifact to generate historical calibration information that serves as the basis for assuring-the quality of measurements and improvement in their accuracy.

6. The method of claim 2 further including the step of tracking said systematic and non-repeatable errors to assess trends and make appropriate updates in error assessments as needed.

7. The method of claim 1 wherein said interferometer is in form a Fizeau interferometer.

8. The method of claim 1 wherein said optical sphere is an optical sphere assembly comprising:
   an optical sphere of nominal radius including internally located motion actuating elements and further includes the steps of:
      supporting and positioning said nominal optical sphere such that its center of curvature rests nominally along the optical axis of the interferometer while otherwise being free to rotate; and
      actuating said nominal optical sphere to undergo a predetermined motion such that interferometrically measured differences between a wavefront reflected from said nominal optical sphere and an incoming wavefront from the interferometer, when sampled over the surface of said nominal optical sphere as it moves, converge to the departure in the incoming wavefront from its nominal value.

9. The method of claim 8 wherein said nominal optical sphere is hollow constructed of a material that is optically transparent at the operating wavelength of the interferometer.

10. The method of claim 9 wherein said material is a ceramic material.

11. The method of claim 8 wherein said step of actuating said nominal optical sphere is configured and arranged to randomly rotate said nominal optical sphere.

12. The method of claim 8 wherein the step of actuating said nominal optical sphere is configured and arranged to selectively rotate said nominal optical sphere so that different preselected areas of its surface are presented to said incoming wavefront at different preselected times.

13. The method of claim 8 further including the step of dynamically balancing said optical sphere.

* * * * *